United States Patent [19]

Schenberg

[11] Patent Number: 5,598,956
[45] Date of Patent: Feb. 4, 1997

[54] PORTABLE GARMENT HANGER DEVICE

[76] Inventor: Gene B. Schenberg, 12315 Montsouris, St. Louis, Mo. 63141

[21] Appl. No.: 382,142

[22] Filed: Feb. 1, 1995

Related U.S. Application Data

[63] Continuation-in-part of Ser. No. 251,612, May 31, 1994, abandoned.

[51] Int. Cl.$^6$ ..................................................... A47G 25/06
[52] U.S. Cl. ........................ 223/1; 223/DIG. 4; 224/493; 224/313; 224/572; 224/318
[58] Field of Search ..................................... 223/1, 85, 88, 223/DIG. 4; 211/113; 224/277, 493, 482, 313, 318, 322, 572

[56] References Cited

U.S. PATENT DOCUMENTS

| | | | |
|---|---|---|---|
| 1,726,316 | 8/1929 | Saxton | 224/482 |
| 2,609,104 | 3/1949 | Leach . | |
| 3,425,539 | 2/1969 | Mach | 224/482 |
| 3,907,118 | 9/1975 | Pelavin . | |
| 4,154,383 | 5/1979 | Honatzis | 224/482 |
| 4,231,501 | 11/1980 | Goode . | |
| 4,763,820 | 8/1988 | Gardner, Jr. . | |
| 5,031,808 | 7/1991 | Dolenc | 224/482 |
| 5,421,494 | 6/1995 | Kolfon | 223/85 |

*Primary Examiner*—Bibhu Mohanty
*Attorney, Agent, or Firm*—Polster, Lieder, Woodruff & Lucchesi

[57] ABSTRACT

A portable garment hanger device for suspension from a vehicle window. The device has a generally elongated, flexible strap. A retainer element is attached on one end of the flexible strap and a hanger receiving member is attached to the opposite end. The hanger receiving member has a body with first and second flat sides. A rigid hook extends from the base of the hanger receiving member outwardly to one side. The sides of the hanger receiving member are flat and somewhat larger than necessary so that an advertising message can be printed on either side. The flexible strap is drapable across the upper edge of a retractable automobile window with the retainer outside the window and the hanger receiving member in the passenger compartment. The raised window holds the flexible strap against the window frame to secure the device in place. In another preferred embodiment, the retainer element and the body of the hanger receiver have complementary latching elements. The flexible strap can be draped around an object and the retainer element and the hanger receiving means latched together to secure the strap around the object.

6 Claims, 4 Drawing Sheets

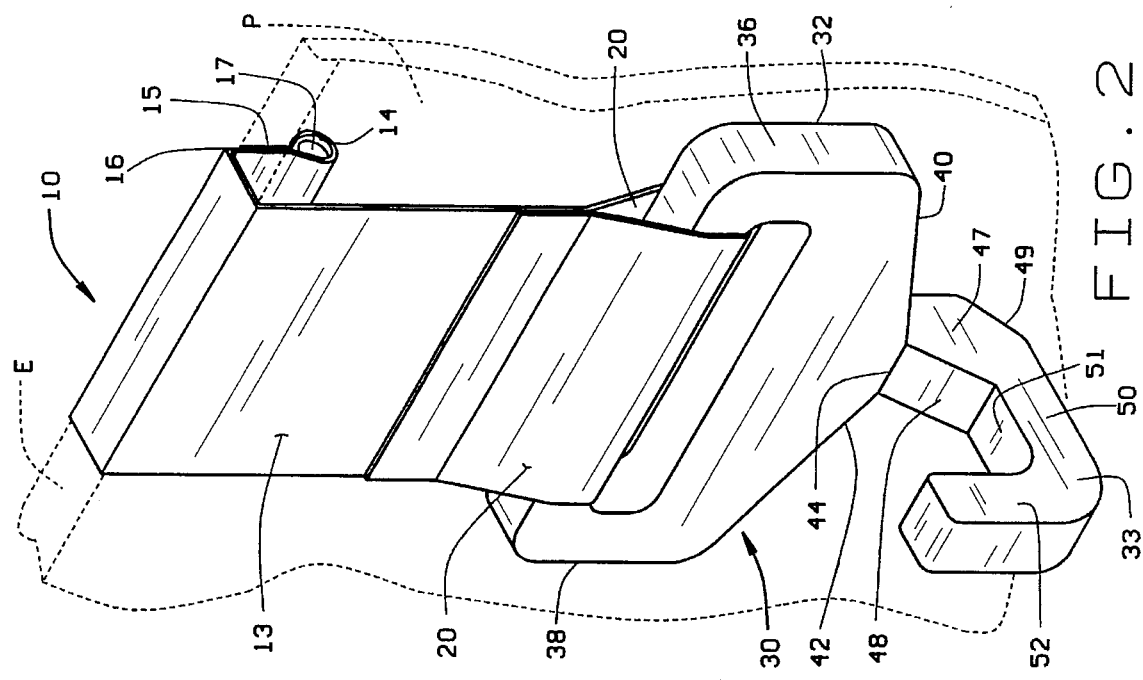
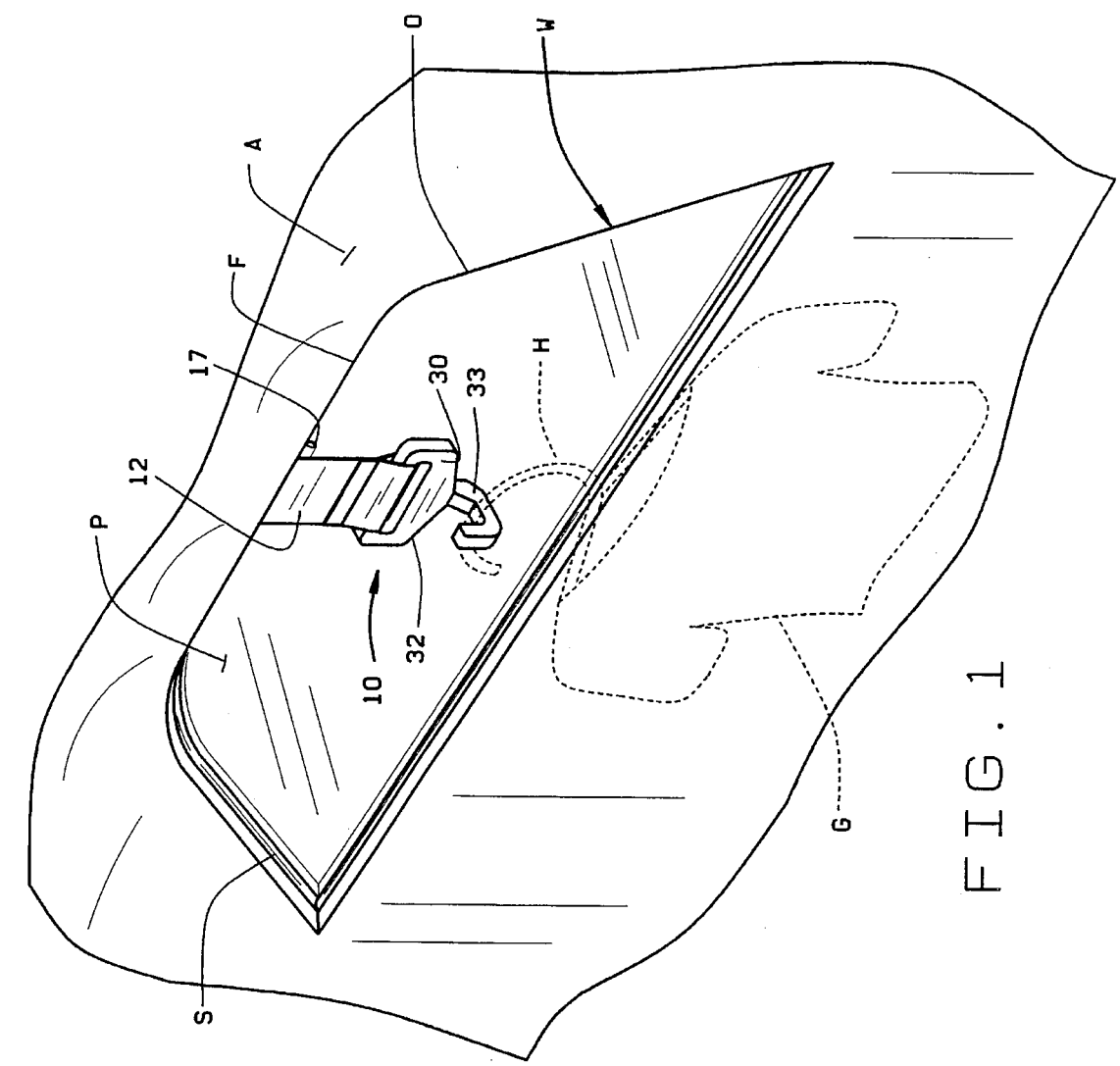

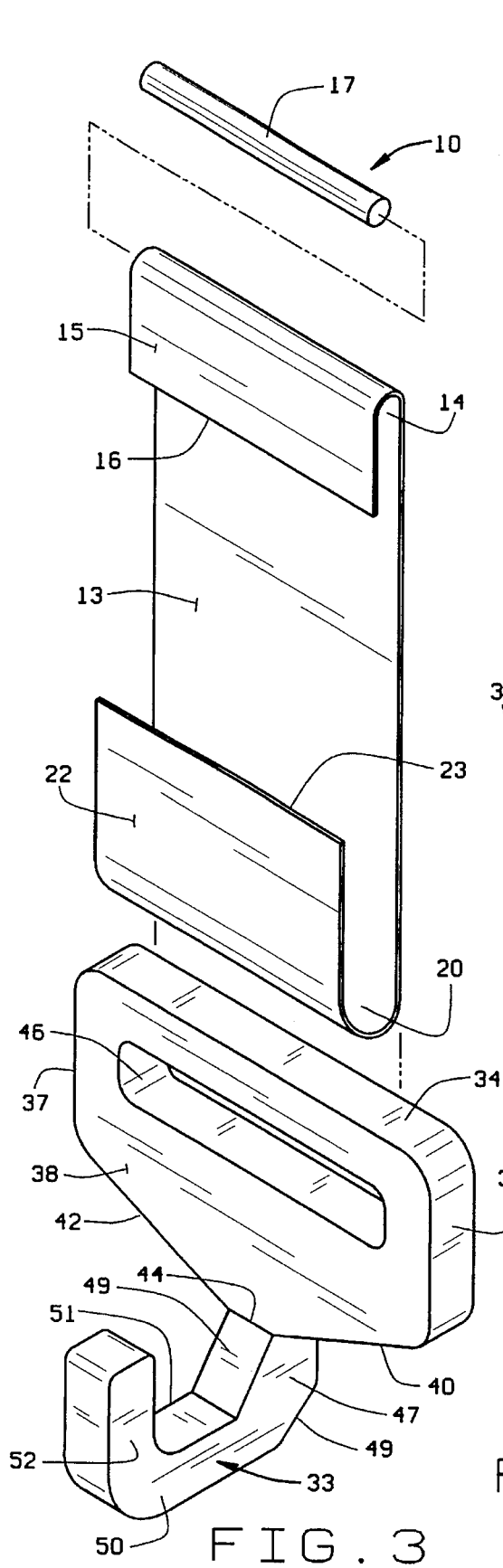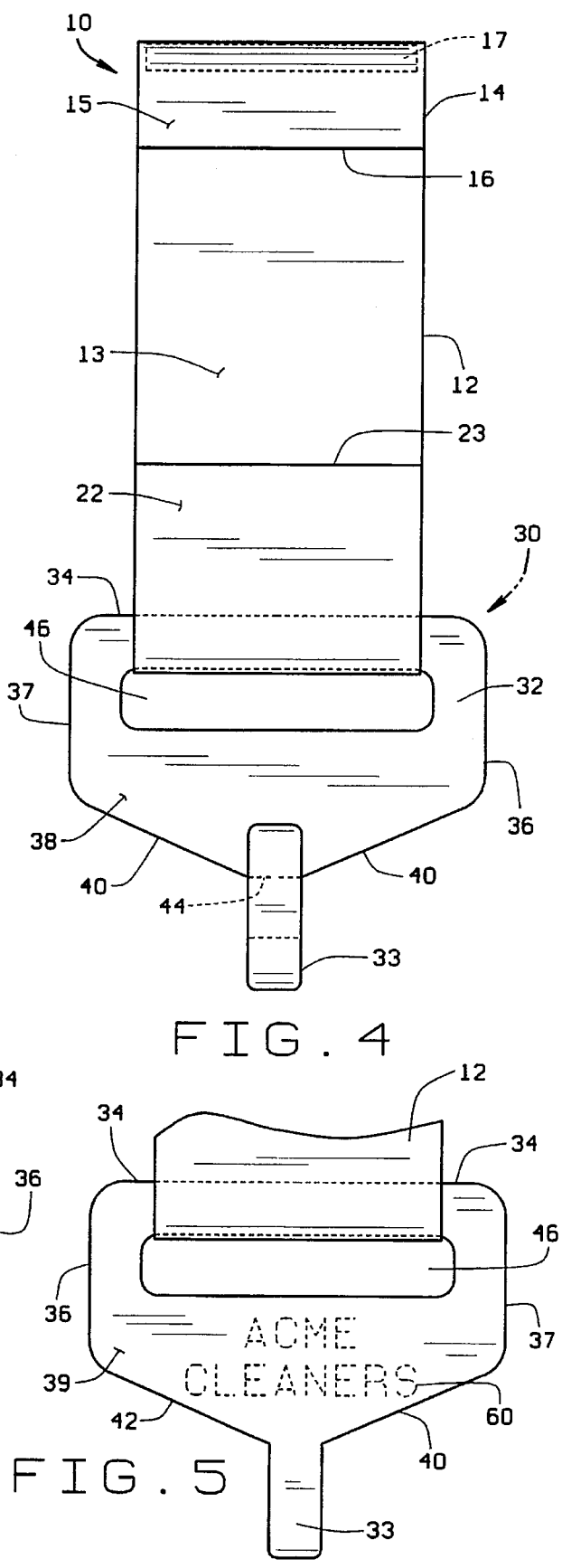

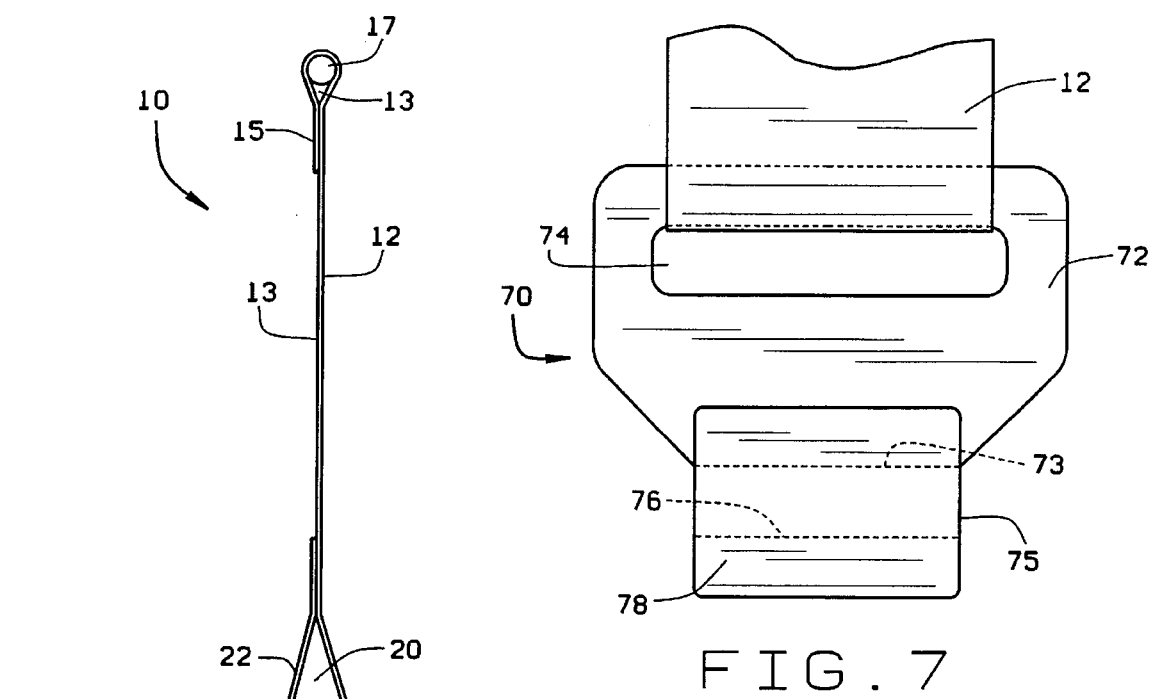
FIG.7
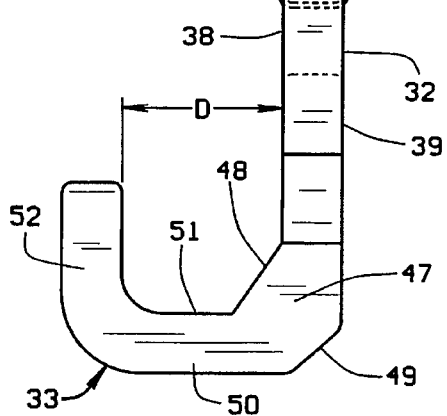
FIG.6
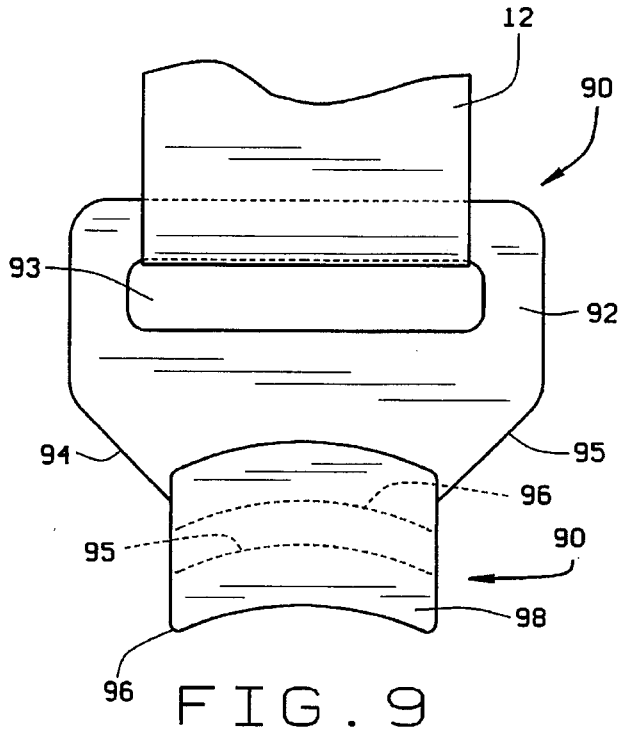
FIG.8
FIG.9

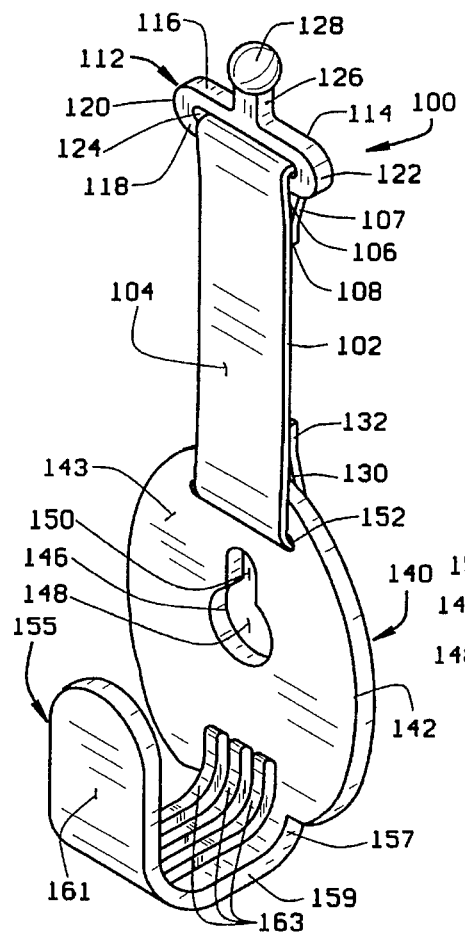
FIG. 10
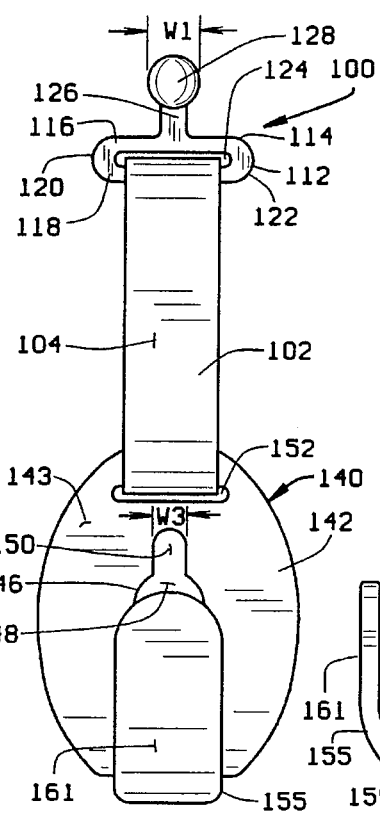
FIG. 11
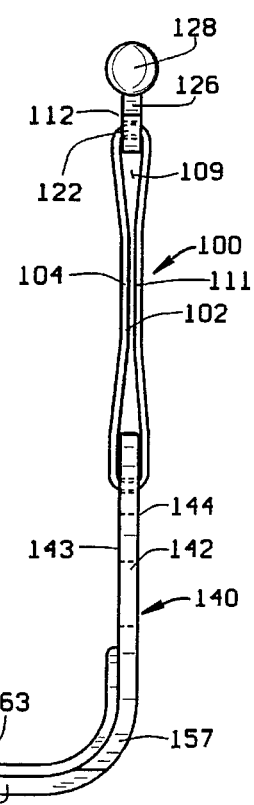
FIG. 12
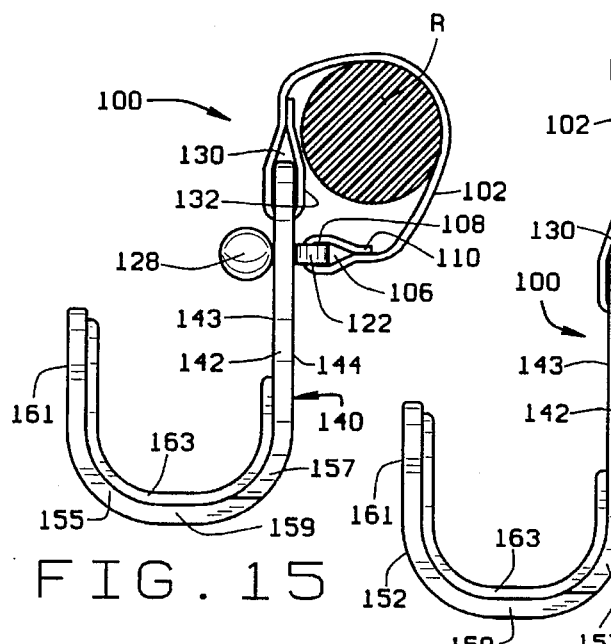
FIG. 15
FIG. 14
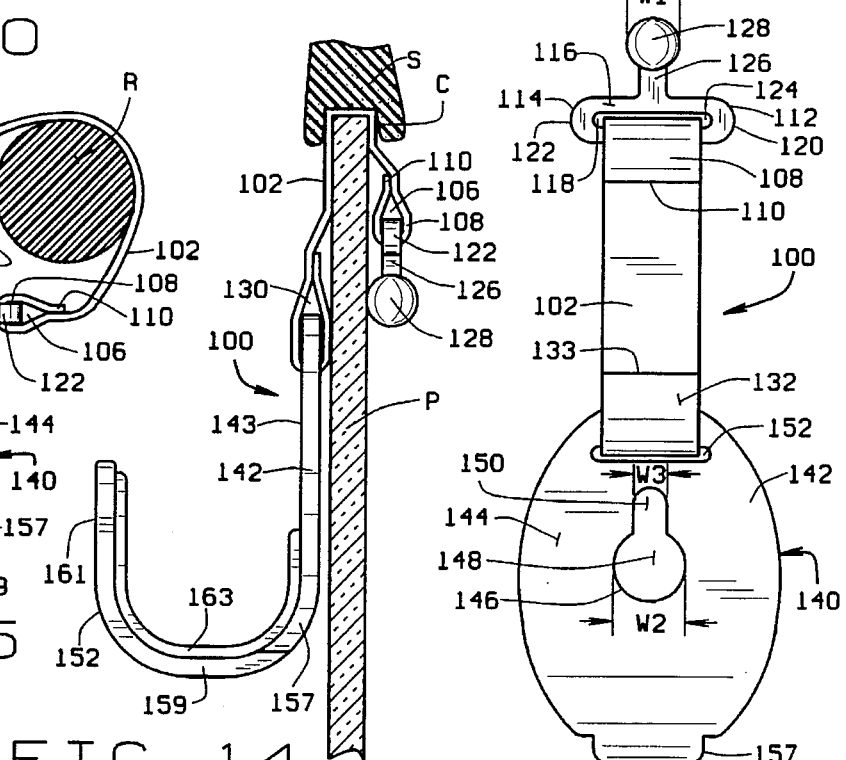
FIG. 13

PORTABLE GARMENT HANGER DEVICE

This application is a continuation-in-part of application Ser. No. 08/251,612, filed May 31, 1994 now abandoned.

BACKGROUND OF THE INVENTION

This invention relates generally to hanger devices, and more particularly to a portable garment hanger device that is secured in place by a closed automobile window or suspended from an object to accommodate the hanging of garments or the like.

Traditionally passenger vehicles or automobiles include some type of hook to accommodate the hanging of garments, especially those garments on conventional wire coat hangers. In recent years, however, automobile manufacturers have reduced the size of the hooks or have replaced the hooks with spool-like pegs or overhead grab handles. Such devices do not readily accommodate multiple hanging garments. The spools or handles are positioned near the interior roof or headliner of the automobile and are difficult to reach. Moreover, the elongated grab handles are generally mounted flat to the headliner and do not readily accommodate conventional wire coat hangers. When such wire coat hangers are hung on grab handles they are generally skewed towards the passenger compartment and the garments intrude on seating space.

Furthermore, the reduced size of the modern automobile garment hooks significantly reduces the number of items that can be hung in the passenger compartment. This creates a problem when a driver of an automobile has a number of items to hang. For example, if a driver picks up a number of clothing items from a dry cleaner he or she can hang only a few on the small hooks. Some of the items must be folded or draped across a seat, resulting in wrinkling of freshly laundered garments.

The present invention overcomes significant drawbacks of original equipment automobile garment hooks by providing an after-market, large capacity hanger that can be mounted in any automobile.

SUMMARY OF THE INVENTION

It is among the various objects of the present invention to provide a portable garment hanger device that can be secured between a window pane and the surrounding window frame of a conventional automobile window, the hanger having a large capacity rigid hanger receiving member to accommodate a plurality of hanging garments.

Another object of the present invention is to provide a garment hanger device having an elongated, flexible body with a retainer element at one end and a pendent hanger receiving member at the other end.

Yet another object of the invention is to provide such a garment hanger device having a flat surface on an exterior side of the hanger receiving member bearing a printed message.

Still another object of the invention is to provide such a hanger device that can be looped around a pole, a handle or other object and secured to itself so as to be securely suspended from the pole or handle.

In accordance with the invention briefly stated, a portable garment hanger device is provided for suspension from a closed automobile window. The hanger device has generally a flat, elongated flexible strap, typically constructed from a resilient fabric material. The strap is draped across the top edge of an automobile window. A retainer element is attached to a first end of the strap and remains on the outside of the window, when the window is closed, securing the hanger device in place. A hanger receiving member is attached to the opposite end of the strap and is suspended on the interior side of the window. The hanger receiving member has a flat body with a protruding rigid hook to accommodate the hanging of garments. A message can be printed on the flat body, either on the hook side, facing into the car, or on the side opposite the protruding hook, viewable through the automobile window. In another preferred embodiment, the retainer element and the hanger receiving member have complementary latching elements so that the strap can be looped about a rod or other object and the retainer element secured to the hanger receiving member to secure the hanger in place.

BRIEF DESCRIPTION OF THE DRAWINGS

FIG. 1 is perspective view of a portable garment hanger device of the present invention attached to an automobile window, the automobile window shown in partial section, with a garment on a conventional wire hanger shown in phantom to illustrate environment;

FIG. 2 is another perspective view thereof;

FIG. 3 is an exploded view of the portable garment hanger device of the present invention;

FIG. 4 is a front elevation view thereof;

FIG. 5 is a rear elevation view thereof;

FIG. 6 is a side elevation view thereof;

FIG. 7 is a partial front elevation view of an alternative embodiment of the garment hanger device of the present invention;

FIG. 8 is a top plan of the embodiment of FIG. 7;

FIG. 9 is a partial from elevation view of another alternative embodiment of the portable garment hanger device of the present invention;

FIG. 10 is a perspective view of another embodiment of the portable garment hanger device of the present invention;

FIG. 11 is a front elevation view of the embodiment of FIG. 10;

FIG. 12 is a side elevation view of the embodiment of FIG. 10 employing an alternative body;

FIG. 13 is a rear elevation view of the device shown in FIG. 10;

FIG. 14 is a side elevation view thereof, the portable garment hanger device attached to an automobile window to illustrate environment; and FIG. 15 is another side elevation view thereof, the portable garment hanger device attached to a horizontal pole, shown in cross section, to illustrate environment.

Similar reference characters indicate similar parts throughout the various views of the drawings.

DESCRIPTION OF THE PREFERRED EMBODIMENT

The portable garment hanger device of the present invention is indicated generally in the various drawings by reference numeral 10. As best seen in FIGS. 1 and 2, hanger 10 is designed to be suspended in a window W of a conventional passenger vehicle, such as an automobile A. Hanger 10 is designed to support a garment G on a conventional wire or plastic coat hanger H. Window W is a conventional automobile side window or, in the case of a station wagon a rear window. Window W has a conventional frame F defining an opening O. Opening O is surrounded by a deformable weather seal S. A retractable pane P of glass moves up and down within opening O. Pane P must be capable of going up to close and down to open, either by a conventional manual crank (not shown) or a conventional power window motor.

As best illustrated in FIGS. 2 to 5, hanger 10 has a flexible body 12 in the form of a strap. Body 12 has a smooth, flat surface 13. Although illustrated in a partially folded configuration in the drawings, it will be appreciated that body 12 is elongated and relatively flat. Body 12 is formed from an appropriate flexible material such as fabric. The fabric is resistant to deterioration by ultraviolet rays in the sunlight as well as heat and moisture. Appropriate fabrics used for the construction of body 12 include, but are not limited to, Gore-Tex®, Tyvek®, rip-stop nylon, or parachute material. It will be appreciated by those skilled in the art that the peripheral edges of body 12 are appropriately sewn or sealed to prevent ripping, fraying, or unraveling of the fabric. Body 12 is an appropriate length and width to allow the other components of the device to be attached and appropriately positioned within window W. In one preferred embodiment, the overall length of body 12, before folding or looping, is approximately 6¾ inches. The width is 2¼. There is a first or upper loop 14 at the upper end of body 12. Loop 14 is formed by folding an upper segment 15 of body 12 and attaching the edge 16 of segment 15 to surface 13. Edge 16 is attached to surface 13 by sewing, gluing, heat sealing or other appropriate attachment means.

There is a retention element 17 in loop 14. In the illustrated embodiment, the retention element is a small diameter rod segment having a diameter of approximately 3/16 inch. The overall length of element 17 is slightly less than the width of body 12. Although shown as a segment of 3/16 inch wood rod, element 17 can be any appropriate element that has a diameter or thickness greater than that of body 12 so that element 17 is raised relative to or thicker than body 12. Element 17 as shown is held in loop 14 by a tight friction fit. Preferably, however, the open ends of loop 14 can be sealed or sewn to positively hold element 17 in place. Alternatively, element 17 can be glued in place inside of loop 14.

There is a second or lower loop 20 at the lower end of body 12. Loop 20 is formed by folding a segment 22 (see FIG. 3) of body 12 and attaching the edge 23 of segment 22 to surface 13. Edge 23 is attached to surface 13 by any appropriate attachment method, as previously described relative to edge 16 of segment 15. Loop 20 is designed for the attachment of the hanger receiving member, which will now be described in greater detail.

One preferred embodiment of the hanger receiving member of the portable hanger device of the present invention is indicated generally by reference numeral 30 in FIGS. 2 to 6. Hanger receiving member 30 has a body 32 and a protruding rigid hook 33. Body 32 has a horizontal top wall 34 (best shown in FIG. 3), opposed vertical side walls 36 and 37, front wall 38, rear wall 39 (FIG. 5), and a pair of angled lower walls 40 and 42 which converge at a blunt point 44. A horizontally elongated hole or slot 46 is formed in an upper portion of body 32, slightly below upper wall 34. Slot 46 is dimensioned to accommodate insertion of segment 22 of body 12. Segment 22 is inserted through slot 46 before edge 23 is sealed to surface 13 to attach hanger receiving member 30 to body 12.

Hook 33 protrudes outward from point 44. Hook 33, in the embodiment shown best in FIG. 6, has a generally "J"-shaped profile. Hook 33 has angularly depending segment 47, with an angled front surface 48 and an angled rear surface 49. The material thickness of segment 47 between angled surfaces 48 and 49 creates a natural support for the hook to prevent bending. A horizontal segment 50 extend out from segment 48. Horizontal segment 50 has a flat contact surface 51. A vertical end segment 52 extends up from horizontal segment 50.

As can be seen in FIG. 4, hook 33 is relatively narrow by comparison to body 32. The distance D between body 32 and vertical segment 52 may vary. It will be appreciated, however, that distance D is substantially greater than that of a conventional automobile garment hook so that the hanger device of the present invention can accommodate a greater number of conventional wire coat hangers or the like. For example, a distance D of one inch works well and accommodates many hangers H. Furthermore, angled surface 49 facilitates the hanging of garments on the hook by guiding the loop of the wire coat hanger towards contact surface 51 as well as preventing bending, as stated above. Although the respective elements of the hanger receiving member 30, including body 32 and the various segments of hook 33, have been described separately, it will be appreciated that the entire hanger receiving member 30 may be formed in one piece from high impact plastic by injection molding of an appropriate resin material. Alternatively, body 32 and hook 33 can be molded separately and appropriately attached. Moreover, body 32 and hook 33 can be constructed from two different materials as long as hook 33 is rigid.

As shown in FIG. 5, a printed message 60, such as an advertising message or business name, may be printed on rear wall 39 for display through the window. Of course, such a message could also be printed on front wall 38.

FIGS. 7 and 8 illustrate an alternative embodiment of a hanger receiving member of the portable garment hanger device of the present invention, indicated generally by reference numeral 70. Hanger receiving member 70 has a body 72 configured substantially similar to body 32 of hanger receiving member 30, previously described. However, body 72 has a blunt point 73 which is substantially wider than blunt point 44 of hanger receiving member 30. Body 72 has a generally horizontal slot 74 formed therein toward the top thereof and a rigid hook 75 protruding outwardly from the bottom. Hook 75 has a depending segment (not shown) which depends from point 73. A generally rectangular, horizontal segment 76 extends out from the depending segment. A vertical segment 78 extends upward from a forward edge of horizontal segment 76. Segment 76 has a flat contact surface 77. The width of surface 77 is greater than approximately one-half (½) the width of strap 12 or hanger receiving member 70. It will be appreciated that a hanger receiving member 70, with relatively wide contact surface 77, is useful and appropriate for particular applications. Hanger receiving member 70 is made from an appropriate material, such as high impact plastic or the like, as previously described with reference to hanger receiving member 30.

FIG. 9 illustrates another embodiment of a hanger receiving member for the portable hanger device of the present invention, indicated generally by reference numeral 90. Hanger receiving member 90 has a body 92 constructed substantially similar to that of the hanger receiving members previously described. Body 92 has a horizontal slot 93 formed therein. It should be noted that angular walls 94 and 95 merge at a generally arcuate point 95. Hanger receiving member 90 has a rigid hook 96 extending outward from point 95. Hook 96 has a horizontal segment 97 and a vertical end segment 98. Horizontal segment 97 and vertical end segment 98 have arcuate cross-sections. The arcuate design of the horizontal segment 97, particularly, allows for the flush seating of the curved or looped portion of a conventional wire coat hanger.

In use, as best illustrated in FIGS. 1 and 2, body 12 is draped across an upper edge E of pane P. Retaining element 17 is on the outside of window W and hanger receiving member 30 is on the inside, with hook 33 protruding inwardly toward the passenger compartment. Pane P is raided within frame F until body 12 is pinched between edge E of pane P and seal S having a channel C, as shown in greater detail in FIG. 14. Pane P biases body 12 against seal S and frame F. Garment G, hanging on a conventional wire coat hanger H, is placed on hook 33. Retention element 17 prevents body 12 from sliding between pane P and frame F when downward pressure is exerted on the device by the weight of garment G.

FIGS. 10 to 15 illustrate another embodiment of the portable garment hanger of the present invention. The portable garment hanger device is indicated generally in the various drawings by reference numeral 100. As best seen in FIG. 15, hanger 100 is designed to be suspended from an object such as a rod R or the like. Furthermore, as shown in FIG. 14, hanger device 100 can be suspended in a window of a conventional passenger vehicle, as described above with reference to hanger 10.

As best illustrated in FIGS. 10 to 13, hanger 100 has a flexible body 102 in the form of a strap. Body 102 has a smooth, flat surface 104. Although shown in a partially folded configuration, it will be appreciated that body 102 is elongated and relatively flat. Body 102 is formed from an appropriate material that is resistant to deterioration. A very thin and deformable, yet durable material such as Tyvek® works well. Body 102 is an appropriate length and width to allow the other elements of the device to be attached and appropriately positioned in a window (FIG. 14) or suspended from a rod (FIG. 15). It is also desirable that surface 104 be of a material on which printing (such as advertising slogans or the like) may be readily imprinted.

Body 102, as shown in FIG. 10, has a first or upper loop 106 at the upper end of body 102. Loop 106 is formed by folding an upper segment 107 of body 102 and attaching the edge 108 of segment 107 to the body. Edge 108 may be attached by sewing, gluing, heat sealing or other appropriate attachment means.

FIG. 12 illustrates an alternative embodiment of body 102. Body 103 is configured in one large loop 109 by looping body 102 and securing it to itself at point 111 by adhesive, sewing or other appropriate means.

A retention element 112 is secured in loop 106 or loop 109. Retention element 112 has a generally horizontal elongated body 114, which has a first or upper horizontal member 116 and a second or slower horizontal member 118. The members 116 and 118 are connected by a first curved end 120 and a second curved end 122. The various elements of retention element 112 are preferably integrally formed from a substantially rigid, durable material such as a plastic or resin material and define a slot 124. Slot 124 is dimensioned to allow the insertion therethrough of segment 108 to form loop 106 or body 102 to form loop 109 (FIG. 12) around member 118 of body 114. There is a neck 126 integrally formed on first member 116. Neck 126 is positioned at the midpoint of member 116. A latching ball or knob 128 is integrally formed on neck 126. It will be appreciated that knob 128 has a diameter or width $W_1$ that is substantially wider than that of neck 126.

As shown in FIG. 10, there is a second or lower loop 130 at the lower end of body 102. Loop 130 is formed by folding a segment 132 of body 102 and attaching an edge 133 of segment 132 to body 102. Loop 130 is designed for the attachment of the hanger receiving member, which will now be described in greater detail. In the embodiment of body 102 shown in FIG. 12, the hanger receiving means is attached by loop 109.

The hanger receiving element of hanger 100 is indicated generally by reference numeral 140. Hanger receiving element 140 has a body 142 with a generally oval configuration (best shown in FIGS. 11 and 13). Body 142 is flat and formed from a substantially rigid, durable material such as plastic or other resin. Body 142 has a flat first or forward surface 143 and flat second or rear surface 144. There is a knob receiving opening 146 formed centrally in body 142. Opening 146 has a keyhole configuration with a lower, circular section 148 and a narrower, upper section 150. Opening 146 is dimension to accept, yet retain, knob 128, as will be explained in detail below. As best seen in FIG. 13, lower section 148 has a width $W_2$ which is slightly greater that the width $W_1$ of knob 128. The greater width of lower section 148 allows knob 128 to pass through the opening. Upper section 150 of opening 146 has a width $W_3$ which is less that the width $W_1$ of knob 128.

Body 142 has a horizontal slot 152 formed near the upper end. Slot 152 is dimensioned to accommodate the insertion of segment 132 of body 102 to secure the hanger receiving member to the strap.

A hook 155 protrudes outward from surface 143. Hook 155, in the embodiment shown, has a generally "J"-shaped profile and has a depending segment 157, a substantially horizontal segment 159 and a vertical segment 161. Hook 155 has a plurality of integral, reinforcing overlays or ribs 163 on the interior side of the hook. Hook 155 functions as the previously described hooks and may have alternative configurations without departing from the scope of the invention.

As stated above, portable hanger device 100 can be employed in at least two different ways. As shown in FIG. 14, body 102 can be draped over a window pane P and pinched between pane P and up into channel C the seal S in a manner previously described in reference to the other embodiments. As shown in FIG. 15, hanger device 100 also can be suspended from an object such as rod R. Body 102 is draped or looped over rod R. Knob 128 is inserted through the lower segment 148 of opening 146. Downward pressure on the hanger receiving element, either by gentle tugging or by the weight of the objects placed on the hanger, causes neck 126 to slide up into upper segment 150 of opening 146. Since knob 128 has width $W_1$ greater that the width $W_3$ of upper segment 150 of opening 146, knob 128 cannot be pulled through segment 150 and is biased against surface 143 of body 142 surrounding opening 146 to secure hanger 100 to rod R. Although hanger device 100 is shown suspended from a rod R for clarity of illustration, it will be appreciated that the hanger can be suspended from any object that will accommodate the strap.

It will be appreciated that various changes and modifications may be made in the hanger device of the present invention without departing from the scope of the appended claims. For example, a hanger device can be placed in opposed rear side windows of an automobile and a garment pole can be suspended between the hooks. Furthermore, garments hung on the hook need not be hung on conventional wire coat hangers. The garments can be hung directly on the hook without the use of a wire hanger. Therefore, in view of the changes and modifications that can be made in the invention without departing from the scope of the claims, the foregoing description and accompanying drawings should be viewed as illustrative only and should not be construed in a limiting sense.

I claim:

1. A suspendable hanger device for suspending from a rod, comprising:

a flexible strap for positioning around the rod;

a retainer element at a first end of the strap, said retainer element having a latch element formed thereon;

a substantially rigid hanger receiving member at a second end of the strap, said hanger receiving member having a substantially flat body portion and a rigid hook protruding therefrom, said body portion having a latch element receiving means formed therein, the flexible strap being configured so that the retainer element at the first end of the strap engages the latch element receiving means on the body portion when the flexible strap is positioned around the rod.

2. The hanger device of claim 1 wherein said latch element is a knob.

3. The hanger device of claim 2 wherein said latch element receiving means is a latch element receiving opening formed in the body portion of said hanger receiving means.

4. The hanger device of claim 2 wherein said latch element receiving opening has a keyhole type configuration.

5. The hanger device of claim 1 wherein said strap is made from a thin, deformable, resilient material.

6. The hanger device of claim 1 wherein said retainer element can be positioned on an outside of an automobile window when the window pane is closed thereby securing the hanger device in place.

* * * * *